(12) United States Patent
Ciotola

(10) Patent No.: US 11,930,797 B2
(45) Date of Patent: Mar. 19, 2024

(54) INTERCHANGEABLE FISHING LURE

(71) Applicant: Brady Ciotola, Amston, CT (US)

(72) Inventor: Brady Ciotola, Amston, CT (US)

( * ) Notice: Subject to any disclaimer, the term of this patent is extended or adjusted under 35 U.S.C. 154(b) by 0 days.

(21) Appl. No.: 17/693,652

(22) Filed: Mar. 14, 2022

(65) Prior Publication Data

US 2023/0284603 A1 Sep. 14, 2023

(51) Int. Cl.
*A01K 85/00* (2006.01)

(52) U.S. Cl.
CPC .................................. *A01K 85/029* (2022.02)

(58) Field of Classification Search
CPC ...... A01K 91/04; A01K 91/047; A01K 91/03; A01K 85/00; A01K 85/10; A01K 85/18; A01K 85/029; A01K 85/1867; A01K 97/00
USPC ............ 43/42.09, 42.49, 43.1, 42.19; 24/908
See application file for complete search history.

(56) References Cited

U.S. PATENT DOCUMENTS

| | | | | |
|---|---|---|---|---|
| 83,681 A * | 11/1868 | Albee | ..................... | A01K 85/00 43/44.81 |
| 2,397,968 A * | 4/1946 | Lind | ....................... | A01K 85/10 D22/128 |
| 2,465,064 A * | 3/1949 | Colosimo | .............. | A01K 85/16 43/42.34 |
| 2,552,248 A * | 5/1951 | Zavod | ..................... | A01K 91/04 403/182 |
| 7,347,458 B2 * | 3/2008 | Rome | .................. | A61M 39/105 285/85 |
| 8,615,920 B2 * | 12/2013 | Taylor | .................... | A01K 91/04 43/42.49 |
| 9,301,514 B2 * | 4/2016 | Pearcy | ................... | A01K 91/03 |
| 11,197,468 B2 * | 12/2021 | Fenton | ................... | A01K 91/04 |
| 2007/0227059 A1 * | 10/2007 | Cox | ...................... | A01K 91/047 43/44.87 |
| 2012/0000111 A1 * | 1/2012 | Griffin | ................... | A01K 85/16 43/42.37 |
| 2013/0291424 A1 * | 11/2013 | Taylor | .................... | A01K 85/00 43/42.49 |

OTHER PUBLICATIONS

APSF Managing Luer Connections (https://www.apsf.org/article/managing-luer-connections/) (Year: 2021).*
Ciotola, Brady; Connecticut Invention Convention, Grade 5, Hebron Elementary, Hebron, Mar. 18, 2021, pp. 3-9.

* cited by examiner

*Primary Examiner* — Timothy D Collins
*Assistant Examiner* — Maria E Graber
(74) *Attorney, Agent, or Firm* — CANTOR COLBURN LLP

(57) ABSTRACT

A fishing lure system includes a first member including a first end and a second end. The first end includes a fishing line connector, and the second end includes a female connector. The fishing lure system further includes a second member including a first end and a second end. The first end includes a male connector that is removably engageable with the female connector of the first member, and the second end includes a fishing hook.

2 Claims, 2 Drawing Sheets

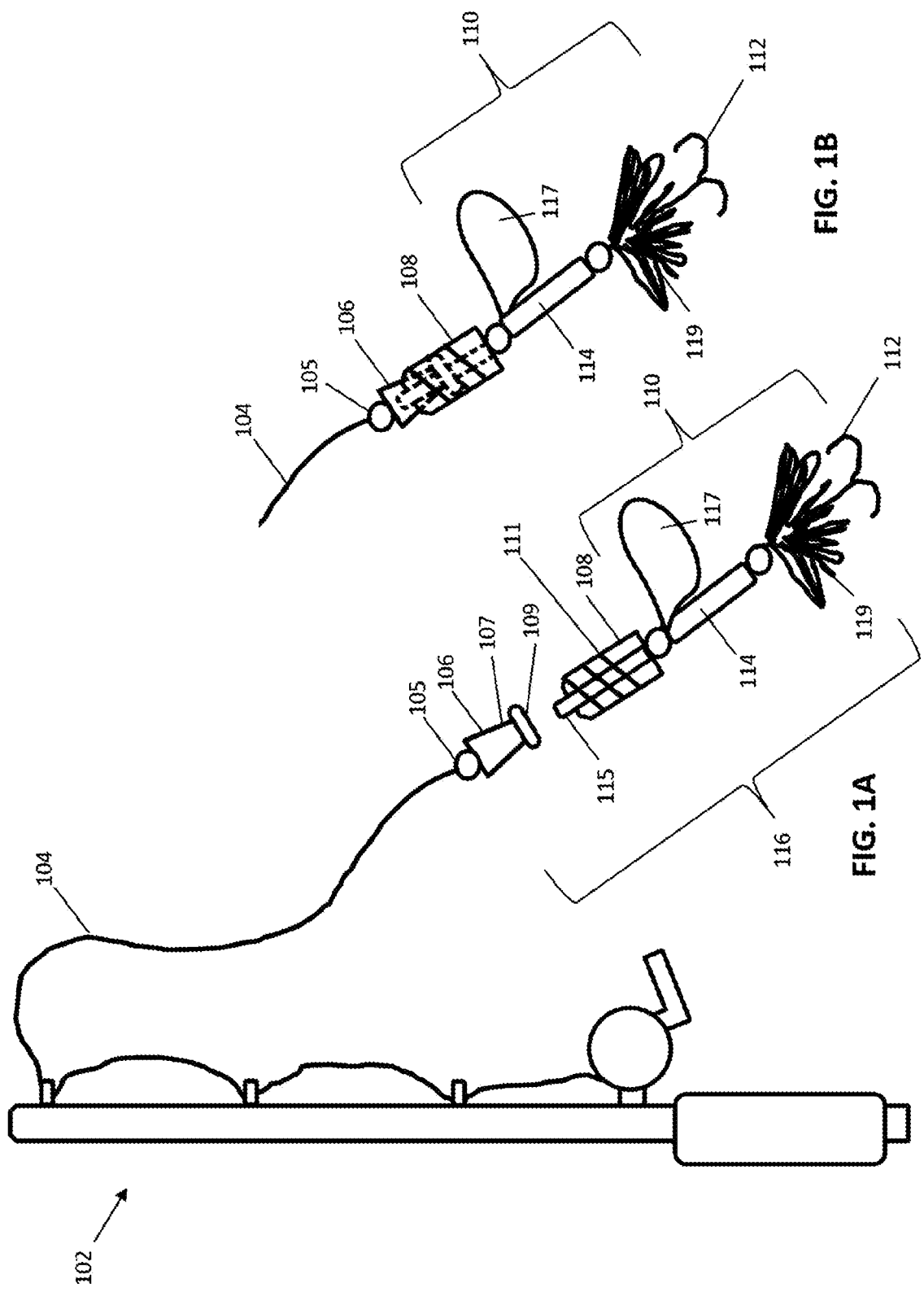

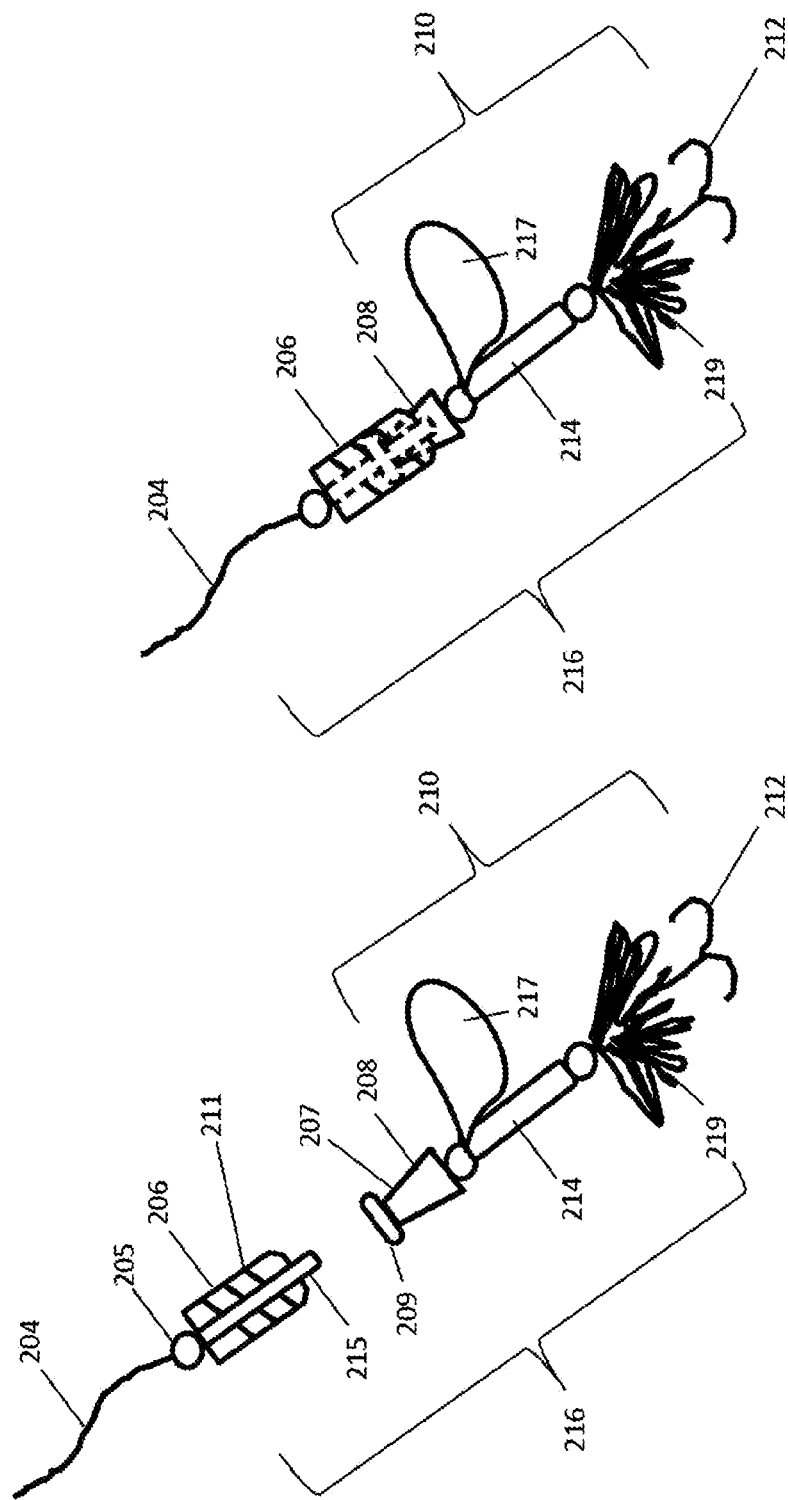

INTERCHANGEABLE FISHING LURE

STATEMENT REGARDING PRIOR DISCLOSURE BY THE INVENTOR

The following disclosure is submitted under 35 U.S.C. § 102(b)(1)(A): Ciotola, Brady, Connecticut Invention Convention, Grade 5, Hebron Elementary, Hebron, Mar. 18, 2021, pages 3-9.

BACKGROUND

The present disclosure relates to fishing lures, and more specifically interchangeable fishing lures, systems, and methods of making and using thereof.

Fishing lures are attached to a fishing line of fishing rod and reel and used to attract and hook fish. A variety of types of fishing lures are used, which depend on the depth and type of water, time of year, and type and size of fish, among many other considerations. The fishing lure includes an eyelet, and the fishing line is fed through the eyelet and tied into a knot to secure the fishing lure to the line.

SUMMARY

According to embodiments, a fishing lure system includes a first member including a first end and a second end. The first end includes a fishing line connector, and the second end includes a female connector. The fishing lure system further includes a second member including a first end and a second end. The first end includes a male connector that is removably engageable with the female connector of the first member, and the second end includes a fishing hook.

According to other embodiments, a fishing lure system includes a first member including a first end and a second end. The first end includes a fishing line connector, and the second end includes a male connector. The fishing lure system further includes a second member including a first end and a second end, the first end includes a female connector that is removably engageable with the male connector of the first member, and the second end includes a fishing hook.

Yet, according to other embodiments, a method of using a fishing lure system includes providing a first member and a second member. The first member includes a first end and a second end. The first end includes a fishing line connector, and the second end includes a female connector. The second member includes a first end and a second end. The first end includes a male connector that is removably engageable with the female connector of the first member, and the second end includes a fishing hook. The method further includes engaging the female connector of the first member with the male connector of the second member.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts:

FIG. 1A is a fishing rod and reel with a fishing lure system according to embodiments;

FIG. 1B is the fishing lure system of FIG. 1A;

FIG. 2A is a fishing lure system according to embodiments; and

FIG. 2B is the fishing lure system of FIG. 2A.

DETAILED DESCRIPTION

For the sake of brevity, conventional techniques related to fishing lures, rods, and reels may or may not be described in detail herein. Moreover, the various tasks and process steps described herein can be incorporated into a more comprehensive procedure or process having additional steps or functionality not described in detail herein.

Fishing lures are attached to fishing lines by feeding the line through the eyelet of the fishing lure and tying a knot to secure the fishing lure to the line. To exchange one lure for another, the line is cut above the fishing lure, or if possible, the line is untied. These steps are time-consuming and challenging under low light conditions, such as during dawn and dusk, and in cold temperatures.

Accordingly, described herein is a fishing lure system, fishing lure, and methods of making and using thereof that include an interchangeable lure system that allows for simple and fast lure exchange, without having to tie and re-tie a fishing lure each time that one is exchanged. The fishing lure system includes a first member that is secured to the fishing line and includes a first connector that is easily removably engageable with a second connector of a fishing lure. In one or more embodiments, the first connector and second connector are male and female connectors, respectively, or female and male connectors, respectively, that are engaged and disengaged by rotating at least one of the members about the central body axis of one of the male and female connectors.

FIG. 1A is a fishing rod and reel 102 with a fishing lure system 116 according to embodiments. The fishing rod and reel 102 includes a fishing line 104. The fishing lure system 116 includes a first member 106 that is removably attached to the fishing line 104 by a first end that includes a fishing line connector 105. The fishing line connector 105 is an eyelet in one or more embodiments, through which the fishing line 104 is threaded and tied to secure the first member 106 to the fishing line 104. In other embodiments, the fishing line connector 105 is a clip, hook, or fastener for attaching the first member 106 to the fishing line 104.

The first member 106 further includes a second end with a female connector 107 with an engaging structure 109 for removable engagement with a male connector 115 of a second member 108 of the fishing lure system 116. In embodiments, the engaging structure 109 is a tab on a distal portion of the second end of the first member 106.

The second member 108 includes a male connector 115 and an engaging structure 111 on an internal surface of the body for engagement with engaging structure 109 of the female connector 107 of the first member. In some embodiments, the engaging structure 111 of the second member 108 is a thread groove. The second member 108 further includes a fishing lure 110. The fishing lure 110 includes a body 114 and a hook 112, and in some embodiments, one or both of a blade 117 and a dressing 119.

To attach the fishing lure 110 to the fishing line 104, the female connector 107 of the first member 106 is engaged with the male connector 115 of the second member 108, as shown in FIG. 1B. In some embodiments, engaging the female connector 107 with the male connector 115 includes rotating one of the female connector 107 and the male connector 115. To disengage and separate and replace the fishing lure 110 with another lure, one of the female connector 107 and the male connector 115 is rotated in the opposite direction relative to rotation for engagement.

In some embodiments, the female connector 107 of the first member 106 is a luer, and the male connector 115 of the second member 108 is a rotating collar with threads. When the fishing lure 110 is attached to the fishing line 104 by engaging the first member 106 with the second member 108, the luer is removably engaged in the threads of the rotating collar.

FIG. 2 is a fishing lure system 216 according to embodiments that includes a first member 206 that is removably attached to the fishing line 204 by a first end that includes a fishing line connector 205. The fishing line connector 205 is an eyelet in one or more embodiments, through which the fishing line 204 is threaded and tied to secure the first member 206 to the fishing line 204. In other embodiments, the fishing line connector 205 is a clip, hook, or fastener for attaching the first member 206 to the fishing line 204.

The first member 206 further includes a second end with a male connector 215 and an engaging structure 211 on an internal surface of the body for removable engagement with engaging structure 209 of the female connector 207 of the second member 208. In some embodiments, the engaging structure 211 of the first member 206 is a thread groove. In embodiments, the engaging structure 209 of the second member 208 is a tab on a distal portion of an end of the second member 208. The second member 208 further includes a fishing lure 210. The fishing lure 210 includes a body 214 and a hook 212, and in embodiments, one or both of a blade 217 and a dressing 219.

To attach the fishing lure 210 to the fishing line 204, the male connector 215 of the first member 206 is engaged with the female connector 207 of the second member 208, as shown in FIG. 2B. In some embodiments, engaging the female connector 207 with the male connector 215 includes rotating one of the female connector 207 and the male connector 215. To disengage and separate and replace the fishing lure 210 with another lure, one of the female connector 207 and the male connector 215 is rotated in the opposite direction relative to rotation for engagement.

In some embodiments, the female connector 207 of the second member 208 is a and the male connector 215 of the first member 206 is a rotating collar with threads. When the fishing lure 210 is attached to the fishing line 204 by engaging the first member 206 with the second member 208, the is removably engaged in the threads of the rotating collar.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A two-piece fishing lure system consisting of:

a first member consisting of a first end of the first member and a second end of the first member, the first end of the first member consisting of a fishing line connector, and the second end of the first member consisting of a female connector consisting of an opening extending from the second end of the first member towards the first end of the first member and a raised engageable portion peripherally protruding only at a terminal end of the second end of the first member about the opening providing a single circular collar continuously surrounding the opening; and a second member consisting of a first end of the second member and a second end of the second member, the first end of the second member consisting of a non-threaded male connector projecting from the first end of the second member and an internally threaded sleeve about a portion of the non-threaded male connector, wherein the non-threaded male connector of the second member is configured to be slidingly and translatably inserted into the opening of the female connector upon threading engagement of the raised engageable portion of the female connector with the internally threaded sleeve of the first end of the second member when in use, wherein the first member is removably engageable with the second member, and wherein the second end of the second member consists of a fishing hook.

2. A two-piece fishing lure system consisting of:

a first member consisting of a first end of the first member and a second end of the first member, the first end of the first member consisting of a fishing line connector, and the second end of the first member consisting of a non-threaded male connector and an internally threaded sleeve surrounding a portion of the non-threaded male connector, wherein the non-threaded male connector projects centrally from the second end of the first member; and a second member consisting of a first end of the second member and a second end of the second member, the first end of the second member consisting of a female connector consisting of an opening extending from the first end of the second member towards the second end of the second member and a raised engageable portion peripherally protruding only at a terminal end of the second end of the second member about the opening providing a single circular collar continuously surrounding the opening that is removably engageable with the internally threaded sleeve of the first member, wherein the opening is configured to receive the non-threaded male connector, and the second end of the second member consists of a fishing hook.

* * * * *